(12) United States Patent
Si et al.

(10) Patent No.: US 9,580,249 B2
(45) Date of Patent: Feb. 28, 2017

(54) CONVEYOR BELT

(71) Applicants: Mayu Si, Hudson, OH (US);
Heng-Huey Yang, Copley, OH (US);
Watudura Prabodha Upul Silva,
Mount Waverly (AU); Michael K. Stockdale, Akron, OH (US); Thomas George Burrowes, N. Canton, OH (US)

(72) Inventors: Mayu Si, Hudson, OH (US);
Heng-Huey Yang, Copley, OH (US);
Watudura Prabodha Upul Silva,
Mount Waverly (AU); Michael K. Stockdale, Akron, OH (US); Thomas George Burrowes, N. Canton, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 0 days.

(21) Appl. No.: 14/607,207

(22) Filed: Jan. 28, 2015

(65) Prior Publication Data

US 2015/0217940 A1  Aug. 6, 2015

Related U.S. Application Data

(60) Provisional application No. 61/934,569, filed on Jan. 31, 2014.

(51) Int. Cl.
*B65G 15/34* (2006.01)
*B65G 15/36* (2006.01)

(52) U.S. Cl.
CPC .............. *B65G 15/34* (2013.01); *B65G 15/36* (2013.01)

(58) Field of Classification Search
CPC ......... B65G 15/32; B65G 15/34; B65G 15/36
See application file for complete search history.

(56) References Cited

U.S. PATENT DOCUMENTS

| | | | | |
|---|---|---|---|---|
| 5,238,991 A * | 8/1993 | Magnus | .................... | C08L 7/00 152/525 |
| 5,451,646 A * | 9/1995 | Castner | ................. | C08F 136/06 524/722 |
| 7,776,967 B2 * | 8/2010 | Perry | .................... | C08G 77/28 524/424 |
| 2012/0258829 A1 * | 10/2012 | Little | .................. | C08K 5/0025 474/266 |
| 2014/0353129 A1 * | 12/2014 | Nakano | .................. | B65G 15/32 198/844.1 |
| 2015/0001047 A1 * | 1/2015 | Nakano | .................. | B65G 15/32 198/844.1 |

FOREIGN PATENT DOCUMENTS

JP   WO 2013088743 A1 *  6/2013  ............. B65G 15/32

\* cited by examiner

*Primary Examiner* — Gene Crawford
*Assistant Examiner* — Keith R Campbell
(74) *Attorney, Agent, or Firm* — Alvin T. Rockhill

(57) ABSTRACT

The present invention relates to a conveyor belt which is comprised of a carry cover layer, a reinforcement layer which is situated below the carry cover layer, and a pulley cover layer which is situated below the reinforcement layer, wherein the carry cover layer is comprised of neodymium polybutadiene rubber.

20 Claims, 1 Drawing Sheet

CONVEYOR BELT

This application claims benefit of U.S. Provisional Patent Application Ser. No. 61/934,569, filed on Jan. 31, 2014. The teachings of U.S. Provisional Patent Application Ser. No. 61/934,569 are incorporated herein by reference in their entirety.

FIELD OF THE INVENTION

The invention relates to conveyor belts that are highly abrasion resistant and which are particularly useful by virtue of their excellent resistance to abrasion in conveying minerals and coal in mining operations.

BACKGROUND OF THE INVENTION

In a multitude of commercial applications, it is common to employ a heavy-duty conveyor belt for the purpose of transporting product and material. The conveyor belts so employed may be relatively long, for example, on the order of miles, and represent a high cost component of an industrial material handling operation. For instance, conveyor belts are widely used for moving minerals, coal, and a wide variety of manufactured products from one point to another. Heavy duty conveyor belts used in mining operations can extend over distances of many miles and represent a high cost component of an industrial material handling operation. For instance, such conveyor belts are often used in typical mining applications to transport minerals below the ground in mines as well as above ground.

Conventional conveyor belts which are used in heavy duty applications are typically comprised of a cured rubber as a top layer, a cured rubber as a bottom layer, and a fabric reinforcement layer (a carcass) which is sandwiched between the top layer and the bottom layer. Conveyor belts used in mining operations can be as large as ten feet wide and up to about three inches thick. The prominent material used in such conveyor belts generally is a moderately flexible elastomeric or rubber-like material, and the belt is typically reinforced by a plurality of longitudinally extending fabric reinforcements or metal cables or cords which are positioned within the belt and extend along the length thereof.

All conveyor belts are, of course, susceptible to normal wear and tear as well as damage from the material being transported and/or harsh environmental conditions. Unfortunately, conveyor belts which are used in mining operations are particularly susceptible to damage from the material transported thereon and a rip, slit, cut or tear may develop on the surface of the belt which comes in contact with the material being transported (the carry cover surface of the belt). For instance, sharp edges of the material being transported, such as iron ore and copper ore which are particularly abrasive, can gouge the surface of the belt and that can result in a rip developing and propagating deeper into the body of the belt. Such damage can ultimately result in belt failure. In the event the conveyor belt suffers catastrophic damage or otherwise becomes inoperable, the costs of repairing the conveyor belt, cleaning up the spilt material, and related downtime can be substantial. In any case, a long service life without the need for continual maintenance and damage repair is highly desirable from the standpoint of cost reduction and efficient utilization of personal and equipment.

Over the years, some improvements have been made in the wear resistance of the rubber cover materials used in manufacturing conveyor belts for transporting highly abrasive materials that quickly wear away conventional rubber conveyor belt covers. However, these improvements have generally only been incremental by virtue of being based upon blends of standard general purpose elastomers, such as styrene-butadiene rubber (SBR), natural rubber, and polybutadiene rubber. In spite of these developments, there remains a long felt need in the mining industry for a premium belt with significantly improved abrasive resistance in order to prolong belt life, reduce mine down-time, and improve productivity. It is also important for such an improved conveyor belt to also retain all other needed performance characteristics to be commercially viable.

One approach to attaining improved abrasion resistance is to incorporate a carry cover layer having improved abrasion characteristics into the conveyor belt. However, it is critical for such a carry cover layer to be capable of being built into the belt in a manner whereby it does not delaminate from the carcass of the belt. In other words, it is critical for such an abrasion resistant material used in making the carry cover layer to exhibit good adhesion to the body of the conveyor belt so that it does not delaminate during the service life of the belt. It is also important for the elastomeric material employed in the carry cover layer to be capable of being compounded in a conventional manner and to be capable of being processed on conventional rubber processing equipment thereby avoiding major capital expenditures. It is also, of course, important for the material to be capable of being used without causing health, safety, and/or environmental issues.

SUMMARY OF THE INVENTION

The present invention is based upon the discovery that neodymium polybutadiene rubber can be built onto heavy duty conveyor belts as a carry cover layer to greatly improve the wear resistance of the belt. The neodymium polybutadiene rubber can be processed on conventional rubber processing equipment and using conventional compounding formulations and techniques. In any case, conveyor belts for heavy duty applications that have greatly enhanced resistance to surface damage can be made by utilizing neodymium polybutadiene rubber in the carry cover layer thereof. Such heavy duty conveyor belts are of particular value for utilization in the mining of iron ore, copper ore, coal, and other abrasive materials. These belts accordingly offer a longer service life, reduce mine down-time, reduce costs, and improve overall mine productivity without having an adverse effect on worker health or safety, and without detrimentally impacting the environment.

The present invention more specifically discloses a conveyor belt which is comprised of a carry cover layer, a reinforcement layer which is situated below the carry cover layer, and a pulley cover layer which is situated below the reinforcement layer, wherein the carry cover layer is comprised of neodymium polybutadiene rubber.

DETAILED DESCRIPTION OF THE INVENTION

Figure 1:
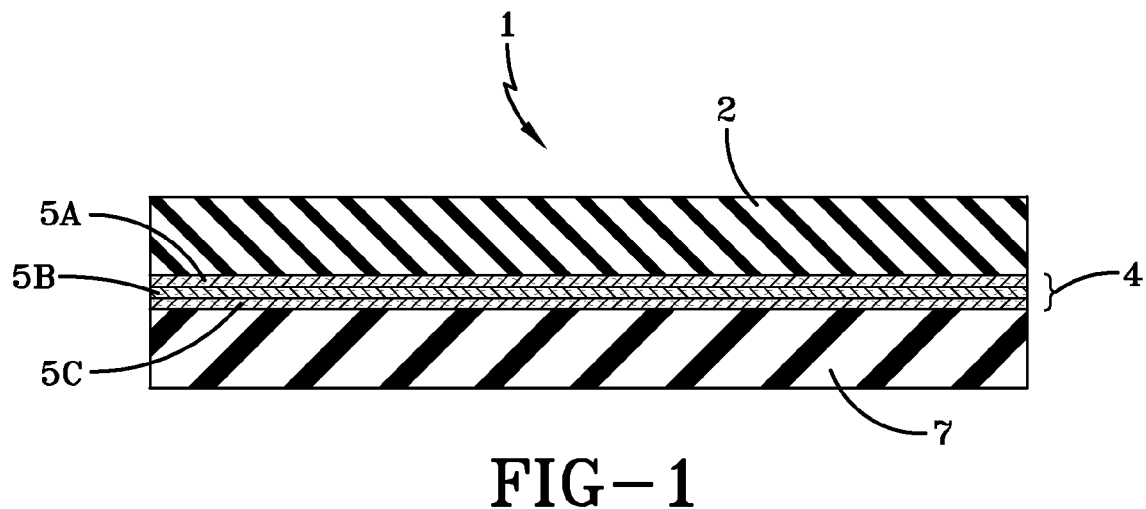
FIG. 1 is a cross-sectional view of a conveyor belt of this invention having a carry cover layer which is comprised of neodymium polybutadiene rubber, a reinforcement layer which is situated below the carry cover layer, wherein the reinforcement layer includes three layers of fabric reinforcement, and a pulley cover layer which is situated below the reinforcement layer.

As illustrated in FIG. 1, the heavy duty conveyor belt 1 of this invention includes a carry cover layer 2 which is comprised neodymium polybutadiene rubber, a reinforcement layer 4 which which is situated below the carry cover layer 2, and a pulley cover layer 7 which is situated below the reinforcement layer 4 and which is comprised of a conventional rubbery polymer. In this embodiment of the invention the reinforcement layer 4 includes a first layer of fabric reinforcement 5A, a second layer of fabric reinforcement 5B, and a third layer of fabric reinforcement 5C. However, in alternative embodiments which this invention the reinforcement layer 4 can contain a single layer of fabric reinforcement, two layers of fabric reinforcement, or four or more layers of fabric reinforcement.

Figure 2:
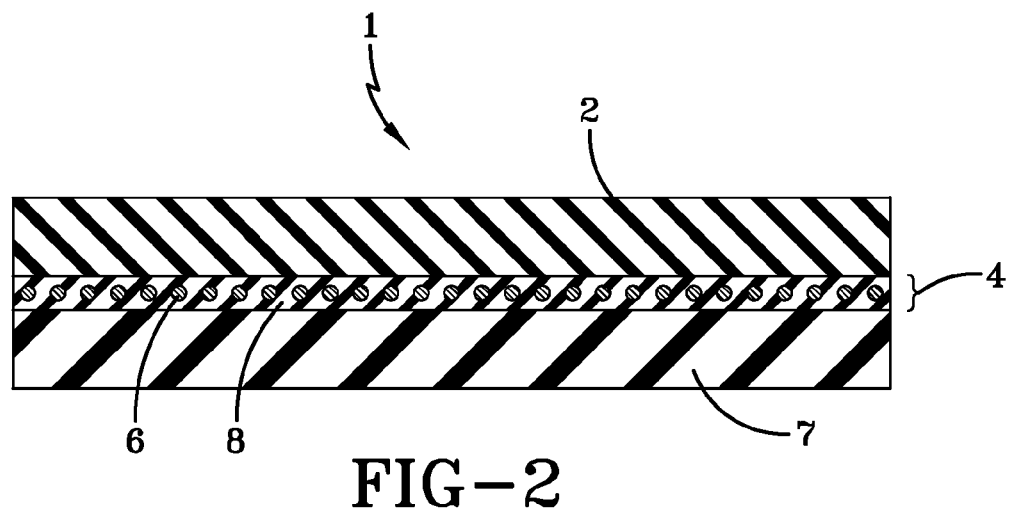
FIG. 2 is a cross-sectional view of a conveyor belt of this invention having a carry cover layer which is comprised of neodymium polybutadiene rubber, a reinforcement layer which is situated below the carry cover layer, wherein the reinforcement layer includes steel reinforcing elements, and a pulley cover layer which is situated below the reinforcement layer.

FIG. 2 illustrates another embodiment of the subject invention wherein the reinforcement layer 4 includes a plurality of steel reinforcing elements 6 which are embedded within the matrix 8 of the reinforcement layer 4. In this embodiment of the invention the heavy duty conveyor belt 1 also includes a carry cover layer 2 which is comprised neodymium polybutadiene rubber, a reinforcement layer 4 which is situated below the carry cover layer 2, and a pulley cover layer 7 which is situated below the reinforcement layer 4 and which is comprised of a conventional rubbery polymer.

The neodymium polybutadiene rubber utilized in the carry cover layer is synthesized utilizing a neodymium catalyst system and is accordingly referred to herein as neodymium polybutaidiene rubber. The neodymium catalyst system systems employed in synthesizing the polybutadiene rubber is normally considered to be "pseudo-living" catalyst system and the polybutadiene rubber synthesized in its presence normally increase in molecular weight with increasing monomer conversions. Such neodymium catalyst systems are typically comprised of is comprised of (1) a neodymium compound, (2) an organoaluminum compound, and (3) at least one compound which contains at least one labile halide ion.

The neodymium compound in the neodymium catalyst system includes a neodymium atom to which ligand-type groups or atoms are joined. These compounds are sometimes known as coordination-type compounds and are typically of the structure $NdL_3$, wherein Nd represents a neodymium atom and wherein L represents an organic ligand. The organic ligand with typically contain from 1 to 20 carbon atoms and will typically be selected from (1) o-hydroxyaldehydes, (2) o-hydroxyphenones, (3) aminophenols, (4) hydroxy esters, (5) hydroxy quinolines, (6) .beta.-diketones, (7) monocarboxylic acids, (8) ortho dihydric phenols, (9) alkylene glycols, (10) dicarboxylic acids, (11) alkylated derivatives of dicarboxylic acids and (12) phenolic ethers.

The organic ligands of the neodymium compound can be of the monovalent and bidentate or divalent and bidentate form. Some representative of such organic ligands or groups include (1) o-hydroxyaldehydes, such as salicylaldehyde, 2-hydroxyl-1-naphthaldehyde, 2-hydroxy-3-naphthaldehyde and the like; (2) o-hydroxyphenones, such as 2'-hydroxyacetophenone, 2'-o-hydroxybutyrophenone, 2'-hydroxypropiophenone and the like: (3) aminophenols such as o-aminophenol, N-methyl o-aminophenol, N-ethyl o-aminophenol and the like; (4) hydroxy esters, such as ethyl salicylate, propyl salicylate, butyl salicylate and the like; (5) phenolic compounds, such as 2-hydroxyquinoline, 8-hydroxyquinoline and the like; (6) β-diketones, such as acetylacetone, benzoylacetone, propionylacetone, isobutyrylacetone, valerylacetone, ethylacetylacetone and the like; (7) monocarboxylic acids, such as acetic acid, propionic acid, valeric acid, hexanoic acid, 2-ethylhexanoic acid, neodecanoic acid, lauric acid, stearic acid and the like; (8) ortho dihydric phenols, such as pyrocatechol; (9) alkylene glycols, such as ethylene glycol, propylene glycol, trimethylene glycol, tetramethylene glycol and the like; (10) dicarboxylic acids, such as oxalic acid, malonic acid, maleic acid, succinic acid, o-phthalic acid and the like; (11) alkylated derivatives of the above-described dicarboxylic acids; and (12) phenolic ethers, such as o-hydroxyanisole, o-hydroxyethyl phenol ether and the like Some representative examples of neodymium compounds that can be utilized include neodymium acetylacetonate, neodymium naphthenate, neodymium neodecanoate, neodymium octanoate, tris-salicylaldehyde neodymium, neodymium tris-(8-hydroxyquinolate), tris(Π-allyl) neodymium chloride, tris(Π-allyl) neodymium bromide, tris(Π-allyl) neodymium iodide, neodymium tetramethoxide, neodymium tetraethoxide, neodymium tetrabutoxide, and other neodymium compounds which are complexed with ligands containing from 1 to 20 carbon atoms.

The organoaluminum compound utilized in the neodymium catalyst system typically contains at least one carbon to aluminum bond and can be represented by the structural formula:

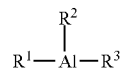

wherein $R^1$, $R^2$, and $R^3$ can be the same or different, wherein $R^1$ is selected from the group consisting of alkyl (including cycloalkyl), alkoxy, aryl, alkaryl, arylalkyl radicals and hydrogen; wherein $R^2$ is selected from the group consisting of alkyl (including cycloalkyl), aryl, alkaryl, arylalkyl radicals and hydrogen; and wherein $R^3$ is selected from a group consisting of alkyl (including cycloalkyl), aryl, alkaryl and arylalkyl radicals. Some representative of the organoaluminum compounds corresponding to this formula include: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The third catalyst component of the neodymium catalyst system is a compound which contains a halide ion. Some representative examples of halide ions which can be utilized include bromide ions, chloride ions, fluoride ions, and iodide ions. A combination of two or more of these ions can also be utilized. These halide ions can be introduced as (1) hydrogen halides: (2) alkyl, aryl, alkaryl, aralkyl and cycloalkyl metal halides wherein the metal is selected from the Groups II, III-A and IV-A of the Periodic Table; (3) halides of metals of Groups III, IV, V, VI-B and VIII of the Periodic Table and (4) organometallic halides corresponding to the general formula $ML_{(3-y)}X_y$ wherein M is a metal selected from the group consisting of metals of Group III-B of the Periodic Table having atomic numbers of 21, 39 and 57 through 71 inclusive: L is an organic ligand containing from 1 to 20 carbon atoms and selected from the group consisting of (a) o-hydroxyaldehydes, (b) o-hydroxyphenones, (c) hydroxyquinolines, (d) β-diketones, (e) monocarboxylic acids, (f) ortho dihydric phenols, (g) alkylene glycols, (h) dicarboxylic acids, (i) alkylated derivatives of dicarboxylic acids and (1) phenolic ethers; wherein X is a halide ion and wherein y is an integer ranging from 1 to 2 representing the number of halide ions attached to the metal M. The organic ligand L may be of the monovalent and bidentate or divalent and bidentate form.

Representative examples of such compounds containing a labile halide ion include (1) inorganic halide acids, such as hydrogen bromide, hydrogen chloride and hydrogen iodide: (2) organometallic halides, such as ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) inorganic halides, such as aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like: and (4) organometallic (Group III-B) halides, such as t-butylsalicylaldehydrocerium (III) chloride, salicylaldehydrocerium (III) chloride, 5-cyclohexylsalicylaldehydrocerium (III) chloride, 2-acetylphenolatocerium (III) chloride, oxalatocerium (III) chloride, oxalatocerium (III) bromide and the like. The preferred compounds which contain a labile halide ion are inorganic halide acids and organometallic halides.

The neodymium catalyst system can be prepared using an "in situ" technique or it can be "preformed." By "in situ" is meant that the catalyst components are added separately to the 1,3-butadiene monomer to be polymerized. By "preformed" is meant the manner in which the catalyst components are mixed together prior to exposure of any of the components to the 1,3-butadiene monomer to be polymerized. It is also known that when employing the type of catalyst system described in this invention, the presence of monomer is not essential to the formation of an active catalyst species, thus, facilitating the use of "preformed" catalysts. Also, it is known that freshly "preformed" catalysts are frequently more active than catalysts which have been allowed to age before use. Greatly improved "preformed" catalysts can be prepared by carrying out the "preforming" in the presence of small amounts of the 1,3-butadiene monomer. Preforming in the presence of 1,3-butadiene monomer results in homogeneous (soluble) catalyst systems, whereas those prepared by mixing in the absence of the 1,3-butadiene monomer are frequently heterogeneous (insoluble). Such a "preforming" technique is described in detail in U.S. Pat. No. 3,794,604 which is incorporated herein by reference.

The proportions of the catalyst components of the neodymium catalyst system used in the polymerization of the 1,3-butadiene monomer can be varied widely. When the halide ion of the halogen containing compound is bromide, chloride or iodide ion, the atomic ratio of the halide ion to the neodymium metal can vary from about 0.1/1 to about 6/1. A more preferred ratio is from about 0.5/1 to about 3.5/1 and the most preferred ratio is about 2/1. However, when the halide ion of the halogen-containing compound is fluoride ion, the ratio of the fluoride ion to the neodymium metal ion ranges from about 20/1 to about 80/1 with the most preferred ratio being about 30/1 to about 60/1. The molar ratio of the trialkylaluminum or alkylaluminum hydride to neodymium metal can range from about 4/1 to about 200/1 with the most preferred range being from about 8/1 to about 100/1. The molar ratio of diolefin to neodymium metal can range from about 0.2/1 to 3000/1 with the most preferred range being from about 5/1 to about 500/1.

The amount of catalyst charged to the polymerization system can be varied over a wide range: the sole requirement being that a catalytic amount of the catalyst composition, sufficient to cause polymerization of the 1,3-butadiene monomer is present in the reaction system. Low concentrations of catalyst are desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer. The concentration of the total catalyst system employed, of course, depends upon factors such as purity of the system, the polymerization rate desired, the polymerization temperature and other factors. Therefore, specific concentrations cannot be set forth except to say that catalytic amounts are used.

The polymerization of the 1,3-butadiene monomer can be carried out by utilizing a bulk polymerization procedure or a solution polymerization procedure employing suitable inert solvents. By the term "inert solvent" is meant that the solvent or diluent does not enter into the structure of, or affect adversely, the resulting polymer. Such solvents are usually aliphatic, aromatic and cycloaliphatic hydrocarbons, representative of which are pentane, normal-hexane, heptane, toluene, cyclohexane and the like. In many case, it is desirable to utilize a solvent which is a mixture of hexanes isomers which is frequently referred to as a "hexanes" solvent. In any case, the solvent/monomer volume ratio may be varied over a wide range. Up to 20 or more to 1 volume ratio of solvent to monomer can be employed. It is usually preferred, or more convenient, to use a solvent/monomer ratio of about 3/1 to about 6/1. In bulk polymerization procedures the reaction medium is substantially solventless and will contain no more than about 10% organic compounds which are solvents for the polymer being synthesized, based upon the total weight of the reaction medium. In most cases the reaction medium will contain less than 4% by weight solvents or virtually no solvents at all. Bulk polymerization can be carried out is the total absence of solvents.

The temperature at which the polymerization reaction is carried out can be varied over a wide range. Usually the temperature can be varied from extremely low temperatures such as −60° C. up to high temperatures such as 150° C. or higher. Thus, the temperature is not a critical factor which has a substantial effect on the polymerization of the 1,3-butadiene monomer into the neodymium polybutadiene rubber. It is generally preferred, however, to conduct the reaction at a temperature in the range of from about 10° C. to about 90° C. to attain a reasonable rate of polymerization and as a matter of convenience. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The polymerization of the 1,3-butadiene rubber with the neodymium catalyst system can be conducted in the presence of a vinyl halide to moderate the molecular weight (Mooney viscosity) of the neodymium polybutadiene rubber produced. The vinyl halides that can utilized as molecular weight regulators include vinyl fluoride, vinyl chloride, vinyl bromide and vinyl iodide. Vinyl bromide, vinyl chloride and vinyl iodide are preferred. Generally, vinyl chloride and vinyl bromide are most preferred. The amount of vinyl halide utilized will vary with the molecular weight which is desired for the polymer being synthesized. The use of greater quantities of the vinyl halide results in the production of a polymer having lower molecular weights. As a general rule, from about 0.05 to 10 phm (parts per hundred parts of monomer) of a vinyl halide will be utilized. In most cases from 0.1 phm to 2.5 phm of a vinyl halide will be present during the polymerization. Persons skilled in the art will be able to easily ascertain the amount of vinyl halide in order to produce a polymer having a specifically desired molecular weight and resultant Mooney viscosity. A more detailed description of the synthesis of neodymium polybutadiene rubber and the control of its molecular weight is provided by U.S. Pat. No. 4,663,405 to Morford Church Throckmorton. The synthesis of neodymium polybutadiene rubber is also described in greater detail in U.S. Pat. No. 4,699,960 to Gordini, Carbonaro, and Spina. The teachings of U.S. Pat. No. 4,663,405 and U.S. Pat. No. 4,699,960 are incorporated herein by reference for the purpose of describing neodymium polybutadiene rubber and the neodymium catalyst systems and polymerization techniques that can be utilized in its synthesis.

The neodymium polybutadiene rubber will have a cis-1,4-microstructure content of at least 96 percent and will frequently have a cis-1,4-microstructure content of at least 97 percent or even 98 percent. The neodymium polybutadiene rubber will typically have a Mooney ML 1+4 viscosity at 100° C. which is within the range of 35 to 65. The neodymium polybutadiene rubber will preferably have a Mooney ML 1+4 viscosity at 100° C. which is within the range of 35 to 60 and will more preferably have a Mooney ML 1+4 viscosity at 100° C. which is within the range of 40 to 50.

The carry cover layer 2 is typically be from about 3/16 inch (5 mm) to 3/8 inch (10 mm) thick and is comprised of a neodymium polybutadiene rubber. The carry cover layer can be made exclusively of the neodymium polybutadiene rubber or it can be a blend of the neodymium polybutadiene rubber with one or more other rubbery polymers. The other rubbery polymers that can be included in such blends with the neodymium polybutadiene rubber can be included at levels of up to 30 phr (parts by weight per 100 parts by weight of rubber). These additional rubbery polymers are typically selected from styrene-butadiene rubber, natural rubber, synthetic polyisoprene rubber, nitrile rubber, isoprene-butadiene rubber, nickel polybutadiene rubber, styrene-isoprene-butadiene rubber, and ethylene-propylene-diene rubber. It is normally preferred for the additional rubbery polymer to be natural rubber or nickel polybutadiene rubber. In any case, the additional rubbery polymer can be included at a level which is within the range of about 1 phr to about 30 phr with the neodymium polybutadiene rubber being present in the carry cover layer 2 at a level which is within the range of about 70 phr to about 99 phr. If desired, the additional rubbery polymer will more typically be included in the carry cover layer 2 at a level which is within the range of about 5 phr to about 25 phr with the neodymium polybutadiene rubber being present at a level which is within the range of about 75 phr to about 95 phr.

Natural rubber and/or nickel polybutadiene rubber can be included in the carry cover layer 2 at a level which is within the range of about 2 phr to about 25 phr with the neodymium polybutadine rubber being present at a level which is within the range of about 75 phr to about 98 phr. More typically natural rubber and/or nickel polybutadiene rubber will be included, if desired, at a level which is within the range of about 5 phr to about 20 phr with the neodymium polybutadine rubber being present at a level which is within the range of about 80 phr to about 95 phr. In cases where natural rubber and/or nickel polybutadiene rubber is included in the carry cover layer it is typically present at a level which is within the range of about 10 phr to about 15 phr with the neodymium polybutadine rubber being present at a level which is within the range of about 85 phr to about 90 phr.

The nickel polybutadiene which can be utilized in the carry cover layer 2 is synthesized utilizing a nickel catalyst system. The nickel catalyst system is typically comprised of (1) an organonickel compound, (2) an organoaluminum compound, and (3) a fluorine containing compound, such as boron trifluoride, hydrogen fluoride and hydrogen fluoride complexes which are prepared by complexing hydrogen fluoride with a ketone, an aldehyde, a nitrile, a mineral acid containing oxygen, an ester, an ether, an alcohol, a phenol or water. The molecular weight of the nickel polybutadiene rubber can be controlled by conducting the polymerization in the presence of a small amount of an olefin selected from the group consisting of 1-butene, isobutylene, cis-2-butene, trans-2-butene and allene. The molecular weight of the nickel polybutadiene rubber can also be controlled by conducting the polymerization in the presence of para-styrenated diphenylamine. A more detailed description of the synthesis of nickel polybutadiene rubber is provided by U.S. Pat. No. 5,698,643 and U.S. Pat. No. 5,451,646. The teachings of U.S. Pat. No. 5,698,643 and U.S. Pat. No. 5,451,646 are incorporated herein by reference for the purpose of describing nickel polybutadiene rubbers and the synthesis of such nickel polybutadiene rubbers. These nickel polybutadiene rubbers include Budene® 1207, Budene® 1208, and Budene® 1280 high cis-1,4-polybutadiene rubbers. Budene® 1280 high cis-1,4-polybutadiene rubber which has a high level of branching and which offers outstanding processability is highly preferred for utilization in the carry cover layer 2.

The nickel polybutadiene rubber will typically have a cis-1,4-microstructure content of at least 96 percent and will more typically have a cis-1,4-microstructure content of at least 97 percent. In some cases the nickel polybutadiene rubber will have cis-1,4-microstructure content of about 98 percent. For instance, the nickel polybutadiene rubber can have a cis-1,4-isomer content of about 97%, a trans-isomer content of about 2%, and a vinyl content of about 1%. The nickel polybutadiene rubber will typically have a Mooney ML 1+4 viscosity at 100° C. which is within the range of about 30 to about 70 and will more typically have a Mooney ML 1+4 viscosity at 100° C. which is within the range of about 35 to about 65. It is typically preferred for the nickel polybutadiene rubber to have a Mooney ML 1+4 viscosity at 100° C. which is within the range of about 40 to about 50. The nickel polybutadiene rubber will also typically have a dilute solution viscosity which is within the range of about 1.8 dl/g to about 2.2 dl/g.

The carry cover layer 2 will also typically be further comprised of at least one reinforcing filler. The reinforcing filler will normally be carbon black, silica, or lignin with carbon black typically being preferred. The filler is normally present at a level which is within the range of 20 phr to 80 phr and is more typically present at a level which is within the range of 30 phr to 75 phr. In most cases the filler will be present in the carry cover layer 2 at a level which is within the range of 40 phr to 70 phr.

Virtually any type of commonly available, commercially-produced carbon black can be used in the practice of this invention. The carbon blacks utilized in the practice of this invention can be in pelletized form or an unpelletized flocculent mass. Preferably, for more uniform mixing, unpelletized carbon black is preferred. Carbon blacks having a surface area (EMSA) of at least 20 m²/g and more preferably at least 35 m²/g up to 200 m²/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above carbon blacks can be employ as reinforcing fillers in the practice of this invention.

The carbon black utilized in the carry cover layer will preferably have a STSA surface area which is within the range of about 60 m²/g to 200 m²/g. The carbon black utilized in the carry cover layer will more preferably have a STSA surface area which is within the range of about 80 m²/g to 160 m²/g. The carbon black will most preferably have a STSA surface area which is within the range of about 100 m²/g to 140 m²/g. The carbon black will also preferably have an OAN structure which is within the range of 100 cc/100 g to 160 cc/100 g and will more preferably have an OAN structure which is within the range of 120 cc/100 g to 145 cc/100 g. In many cases it is preferred to utilize N121 carbon black in the practice of this invention. N121 carbon black has an iodine absorption number which is within the range of 114 to 128 g/kg, a DBP absorption number of 124 to 140 10-5 m²/kg, a CTAB absorption specific surface area of 112 to 130 10³ m²/kg, a STSA of 105 to 123 10³ m²/kg, a nitrogen absorption specific surface area of 115-129 10³ m²/kg, a tint strength of 111-127%, a heat loss maximum of 3%, a pour density of 280 to 360 kg/m³, and a maximum ash content of 0.5%.

The carry cover layer 2 can also contain a reinforcing silica. The reinforcing silica filler that can be used in the carry cover layer 2 of the conveyor belts of this invention can also typically be characterized by having a dibutylphthalate (DBP) absorption value in a range of about 100 to about 400, and more usually about 150 to about 300. The reinforcing silica filler typically has an average ultimate particle size which is within the range of 0.01 to 0.05 micron as determined using an electron microscope, although specific silica particles may be even smaller, and sometimes larger in size. Various commercially available reinforcing silica fillers may be used in the practice of this invention. Some representative examples of such silicas include those from PPG Industries that are sold under the Hi-Sil trademark with designations 210 and 243, silicas available from Rhone-Poulenc with the designations of Z1165MP and Z165GR, and silicas available from Evonik Industries with the designation Ultrasil® 7000 GR with a BET surface area of approximately 170 m²/g.

In cases where a reinforcing silica is employed as a filler a silane coupling agent will also be included at a level which is within the range of 1 phr to about 5 phr. The silica coupling agent will typically be a mercaptosilane, a blocked mercaptosilane, or an organosilicon compound of the general formula:

$$Z-Alk-S_n-Alk-Z \quad (I)$$

in which Z is selected from the group consisting of:

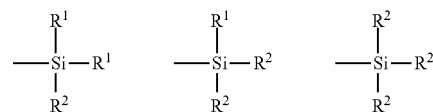

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication No. WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis (trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl) tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis (diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis (trimethoxysilylbutyl)tetrasulfide, 6,6'-bis (triethoxysilylhexyl)tetrasulfide, 12,12'-bis (triisopropoxysilyl dodecyl)disulfide, 18,18'-bis (trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis(triethoxysilylpropyl)tetrasulfide. Therefore with respect to formula I, Z is preferably

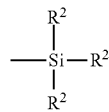

wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 5 parts by weight per part by weight of the siliceous fillers. Preferably, the amount of silica coupling agent utilized will range from about 0.02 to about 1 parts by weight per part by weight of the siliceous fillers. Preferably, the amount of silica coupling agent utilized will range from about 0.04 to about 0.4 parts by weight per part by weight of the siliceous fillers. More preferably the amount of the silica coupling agent included in the elastomeric compositions of this invention will range from about 0.05 to about 0.25 parts by weight per part by weight of the siliceous fillers.

To attain optimal belt performance characteristics including the highest levels of abrasion resistance it is desirable for the rubber formulation utilized in the carry cover layer to include a maximum level of 2.0 phr waxes. It is also preferred for the rubber formulation of the carry cover layer to include no more than about 2.5 phr of process aid additives, preferably no more than 1.0 phr of process aid additives, with it being most preferred for the rubber formulation used in the carry cover layer to be free of process aid additives. It is also preferred for the carry cover layer to include zinc oxide at a level of which is in the range of 2.5 phr to 5 phr and preferably at a level of which is in the range of 2.5 phr to 3.5 phr. In one embodiment of this invention the rubber formulation utilized in the carry cover layer contains less than 0.5 phr of tackifier resins and is preferably void of tackifier resins.

The reinforcement layer 4 is comprised of a fabric or steel reinforcement, such as galvanized steel. The fabric utilized in the reinforcement layer 4 can be comprised of virtually any fabric material having suitable physical properties. For instance the fabric can be a polyester fabric, a nylon fabric, or a polyester-nylon fabric. The fabric is typically coated with a conventional resorcinol-formaldehyde-latex (RFL) dip as is widely used throughout the tire and industrial rubber products industry for treating fabric reinforcements. U.S. Pat. No. 3,525,703 discloses a water-based adhesive composition for bonding synthetic fiber material to rubber which can be employed in the practice of this invention. The teachings of U.S. Pat. No. 3,525,703 specifically disclose the utilization of styrene-butadiene latex and vinylpyridine-styrene-butadiene latex in such water-based adhesive compositions. The teachings of U.S. Pat. No. 3,525,703 are incorporated herein by reference for the purpose of describing a suitable dip formulation.

A typical RFL dip formulation can contain about 250 to 30 parts by weight of water, 5 to 15 parts by weight of resorcinol, about 10 to 20 parts by weight of formaldehyde, about 0.1 to 0.5 parts by weight of sodium hydroxide, about 200 to 280 parts by weight of vinylpyridine latex, and about 8 to 16 parts by weight of ammonia. Such an RFL dip can be made by first preparing a resorcinol-formaldehyde solution by mixing the desired amount of sodium hydroxide (NaOH) into water and then adding the desired amounts of resorcinol and formaldehyde into basic water solution with constant stirring. Then, the RFL dip solution is made by adding the desired amount of the resorcinol-formaldehyde solution into the vinylpyridine latex with the solution being constantly stirred. At that point, the desired amount of ammonia is added with mixing being continued until a homogeneous solution attained. The temperature will normally be maintained between about 70° F. (21° C.) to 80° F. (27° C.) during the entire mixing procedure. The RFL dip can then be used to coat the fabric material which will normally be a woven fabric using conventional procedures.

The pulley cover layer 6 is situated below the reinforcing layer 4 and is comprised of a conventional rubber. The conventional rubber will typically be styrene-butadiene rubber, natural rubber, synthetic polyisoprene rubber, polybutadiene rubber, polychloroprene rubber, or nitrile rubber (a copolymer of 1,3-butadiene and acrylonitrile).

This invention is illustrated by the following examples that are merely for the purpose of illustration and are not to be regarded as limiting the scope of the invention or the manner in which it can be practiced. Unless specifically indicated otherwise, parts and percentages are given by weight.

TABLE 1

| Example | 1 | 2 | 3 |
|---|---|---|---|
| Natural Rubber | 30 | 30 | 30 |
| Budene ® 1280 Ni PBD | — | 70 | — |
| Budene ® 1208 Ni PBD | — | — | 70 |
| Neodene ® Nd PBD | 70 | — | — |
| N220 Carbon Black | 44.5 | 44.5 | 44.5 |
| Aromatic Oil | 4 | 4 | 4 |
| Waxes | 2 | 2 | 2 |
| Antidegredants | 6 | 6 | 6 |
| Processing Aid | 1 | 1 | 1 |
| Stearic Acid | 2 | 2 | 2 |
| Zinc Oxide | 3 | 3 | 3 |
| Sulfur | 1.25 | 1.25 | 1.25 |
| Accelerator | 1.25 | 1.25 | 1.25 |
| Mooney viscosity (250° F., 20 minutes, small rotor) minimum value | 30.4 | 25.4 | 29.1 |
| Moving die rheometer (305° F., 40 minutes) | | | |
| Minimum (dNm) | 4.145 | 4.07 | 4.62 |
| Maximum (dNm) | 26.75 | 24.39 | 29.43 |
| time to 1 point rise (minutes) | 4.12 | 4.54 | 4.19 |
| T90 (minutes) | 8.24 | 9.01 | 8.22 |
| S90 (minutes) | 24.49 | 22.38 | 26.95 |
| rate (dNm/min) | 9.72 | 7.95 | 11.1 |
| Amount (dNm) | 22.61 | 20.32 | 24.81 |
| Tensile Strength (psi) | 2997 | 2840 | 2825 |
| Elongation | 631% | 663% | 626% |
| 100% Modulus (psi) | 281 | 223 | 262 |
| 300% Modulus (psi) | 917 | 814 | 900 |
| Shore A Hardness | 57 | 54 | 57 |
| Die B Tear (pli) | 519 | 533 | 520 |
| Die C Tear (pli) | 252 | 444 | 250 |
| Non-Rotating DIN Abrasion index | 24 | 30 | 31 |

Ni PBD = nickel polybutadiene rubber
Nd PBD = neodymium polybutadiene rubber
pli = pounds per linear inch As can be seen from Table 1 only the rubber formulation made with the neodymium polybutadiene rubber (Example 1) exhibited good DIN abrasion while maintaining acceptable processing and cure characteristics. In fact, the carry cover layer formulation made exhibited non-rotating DIN abrasion of less than 25. It should also be noted that this improvement in abrasion resistance was attained without sacrificing other important physical properties.

While certain representative embodiments and details have been shown for the purpose of illustrating the subject invention, it will be apparent to those skilled in this art that various changes and modifications can be made therein without departing from the scope of the subject invention.

What is claimed is:

1. A conveyor belt which is comprised of a carry cover layer, a reinforcement layer which is situated below the carry cover layer, and a pulley cover layer which is situated below the reinforcement layer, wherein the carry cover layer is comprised of 20 phr to 80 phr of carbon black, 75 phr to 98 phr of neodymium polybutadiene rubber and 2 phr to 25 phr of natural rubber, wherein the carbon black consists of carbon black having a STSA surface area which is within the range of 80 m²/g to 200 m²/g, and wherein the neodymium polybutadiene rubber has a cis-1,4-isomer content of at least 96 percent.

2. The conveyor belt as specified in claim 1 wherein the carry cover layer is further comprised of at least one additional rubbery polymer selected from the group consisting of styrene-butadiene rubber, synthetic polyisoprene rubber, nitrile rubber, isoprene-butadiene rubber, nickel polybutadiene rubber, styrene-isoprene-butadiene rubber, and ethylene-propylene-diene rubber.

3. The conveyor belt as specified in claim 2 wherein the additional rubbery polymer is nickel polybutadiene rubber.

4. The conveyor belt as specified in claim 3 wherein the nickel polybutadiene rubber has a cis-1,4-isomer content of at least 96 percent.

5. The conveyor belt as specified in claim 1 wherein the carry cover layer includes waxes at a level of 0 phr to 2.0 phr.

6. The conveyor belt as specified in claim 5 wherein the carry cover layer includes zinc oxide at a level of which is in the range of 2.5 phr to 5 phr.

7. The conveyor belt as specified in claim 6 wherein the carry cover layer includes no more than about 2.5 phr of process aid additives.

8. The conveyor belt as specified in claim 5 wherein the carry cover layer includes zinc oxide at a level of which is in the range of 2.5 phr to 3.5 phr.

9. The conveyor belt as specified in claim 8 wherein the carry cover layer includes no more than about 1.0 phr of process aid additives.

10. The conveyor belt as specified in claim 5 wherein the carry cover layer is void of process aid additives.

11. The conveyor belt as specified in claim 1 wherein the carbon black has a STSA surface area which is within the range of 100 m²/g to 200 m²/g.

12. The conveyor belt as specified in claim 1 wherein the carbon black has a STSA surface area which is within the range of 100 m²/g to 140 m²/g.

13. A conveyor belt which is comprised of a carry cover layer, a reinforcement layer which is situated below the carry cover layer, and a pulley cover layer which is situated below the reinforcement layer, wherein the carry cover layer is comprised of neodymium polybutadiene rubber and nickel polybutadiene rubber, wherein the nickel polybutadiene rubber is present at a level which is within the range of about 2 phr to about 25 phr and wherein the neodymium polybutadiene rubber is present at a level which is within the range of about 75 phr to about 98 phr.

14. The conveyor belt as specified in claim 13 wherein the nickel polybutadiene rubber has a cis-1,4-isomer content of about 97%, a trans-isomer content of about 2%, and a vinyl content of about 1%, and wherein the nickel polybutadiene rubber has a Mooney ML 1+4 viscosity at 100° C. which is within the range of about 30 to about 70.

15. The conveyor belt as specified in claim 14 wherein the nickel polybutadiene rubber has a dilute solution viscosity which is within the range of about 1.8 dl/g to about 2.2 dl/g.

16. A conveyor belt which is comprised of a carry cover layer, a reinforcement layer which is situated below the carry cover layer, and a pulley cover layer which is situated below the reinforcement layer, wherein the carry cover layer is comprised of 20 phr to 80 phr of carbon black, 75 phr to 98 phr of neodymium polybutadiene rubber, and 2 phr to 25 phr of natural rubber, wherein the neodymium polybutadiene rubber has a cis-1,4-isomer content of at least 96 percent, and wherein the carbon black is N121 carbon black having an iodine absorption number which is within the range of 114 g/kg to 128 g/kg, a DBP absorption number which is within the range of $124 \times 10^{-5}$ m²/kg to $140 \times 10^{-5}$ m²/kg, a CTAB absorption specific surface area which is within the range of 112×10³ m²/kg to 130×10³ m²/kg, a STSA which is within the range of 105×10³ m²/kg to 123×10³ m²/kg, a nitrogen absorption specific surface area which is within the range of 115×10³ m²/kg to 129×10³ m²/kg, a tint strength which is within the range 111% to 127%, a pour density which is within the range of 280 kg/m³ 360 kg/m³, and a maximum ash content of 0.5%.

17. The conveyor belt as specified in claim 16 wherein the carry cover layer is void of process aid additives.

18. The conveyor belt as specified in claim 16 wherein the carry cover layer is void of tackifier resins.

19. The conveyor belt as specified in claim 16 wherein the carbon black is present at a level which is within the range of 35 phr to 75 phr.

20. The conveyor belt as specified in claim 16 wherein the carbon black is present at a level which is within the range of 40 phr to 70 phr.

* * * * *